(12) United States Patent
Chen et al.

(10) Patent No.: US 11,126,815 B2
(45) Date of Patent: Sep. 21, 2021

(54) FINGERPRINT SENSOR AND FINGERPRINT SENSING METHOD THEREOF

(71) Applicant: Egis Technology Inc., Taipei (TW)

(72) Inventors: Yung-Fu Chen, Taipei (TW);
Chih-Hsien Weng, Taipei (TW);
Chih-Ming Yuan, Taipei (TW)

(73) Assignee: Egis Technology Inc., Hsinchu (TW)

( * ) Notice: Subject to any disclaimer, the term of this patent is extended or adjusted under 35 U.S.C. 154(b) by 41 days.

(21) Appl. No.: 16/586,914

(22) Filed: Sep. 28, 2019

(65) Prior Publication Data

US 2020/0175240 A1 Jun. 4, 2020

Related U.S. Application Data

(60) Provisional application No. 62/774,331, filed on Dec. 3, 2018.

(30) Foreign Application Priority Data

Aug. 26, 2019 (CN) .......................... 201910787753.4

(51) Int. Cl.
*G06K 9/00* (2006.01)
(52) U.S. Cl.
CPC ......... *G06K 9/0002* (2013.01); *G06K 9/0004* (2013.01); *G06K 9/0012* (2013.01); *G06K 9/00033* (2013.01)
(58) Field of Classification Search
CPC ............. G06K 9/0002; G06K 9/00033; G06K 9/0004; G06K 9/0012; G06K 9/00026
See application file for complete search history.

(56) References Cited

U.S. PATENT DOCUMENTS

| 10,014,341 B1 | 7/2018 | Hsu et al. | |
| 2015/0186705 A1* | 7/2015 | Magi | G06F 1/163 |
| | | | 382/125 |
| 2018/0129798 A1 | 5/2018 | He et al. | |
| 2020/0005018 A1* | 1/2020 | Lo | G06K 9/00067 |
| 2020/0042762 A1* | 2/2020 | Fu | H01L 27/1104 |

FOREIGN PATENT DOCUMENTS

| CN | 108668093 | 10/2018 |
| TW | I636393 | 9/2018 |

* cited by examiner

*Primary Examiner* — John B Strege
(74) *Attorney, Agent, or Firm* — JCIPRNET

(57) ABSTRACT

The disclosure provides a fingerprint sensor and a fingerprint sensing method thereof. The fingerprint sensor includes an optical sensing array, an analog front end circuit and an image processing circuit. The optical sensing array is configured for sequentially outputting a plurality of analog fingerprint images corresponding to a finger. The analog front end circuit is coupled to the optical sensing array. The analog front end circuit is configured for sequentially receiving and converting the plurality of analog fingerprint images into a plurality of first digital fingerprint images. The image processing circuit is coupled to the analog front end circuit. The image processing circuit is configured for sequentially superimposing the plurality of first digital fingerprint images to generate an enhanced fingerprint image.

12 Claims, 2 Drawing Sheets

FINGERPRINT SENSOR AND FINGERPRINT SENSING METHOD THEREOF

CROSS-REFERENCE TO RELATED APPLICATION

This application claims the priority benefits of U.S. provisional application Ser. No. 62/774,331, filed on Dec. 3, 2018, and China application serial no. 201910787753.4, filed on Aug. 26, 2019. The entirety of each of the above-mentioned patent applications is hereby incorporated by reference herein and made a part of this specification.

BACKGROUND

Technical Field

The disclosure relates to a sensing technology and, in particular, to a fingerprint sensor and a sensing method of the fingerprint sensor.

Description of Related Art

In recent years, optical fingerprint sensing technologies are widely applied to various electronic devices or terminal equipment to provide various identify logon or identify verification functions. Generally speaking, an optical sensing array of the fingerprint sensor may acquire a fingerprint image when a user presses the fingerprint sensor. The electronic device or the terminal equipment may acquire a fingerprint feature according to the fingerprint image for a subsequent identification or verification operation. However, in the process in which the optical sensing array senses the fingerprint, the optical sensing array is susceptible to noise resulting from background light or factors involved in the material or the production process of the sensor itself, which leads to a relatively low signal-to-noise ratio (SNR) of the fingerprint image output by the fingerprint sensor that makes identification more difficult. Therefore, how to increase the SNR of the fingerprint sensor is an important issue to work on in this field.

SUMMARY

In view of this, the disclosure provides a fingerprint sensor and a fingerprint sensing method thereof, by which a fingerprint image with a high SNR can be acquired.

According to an embodiment of the disclosure, a fingerprint sensor provided by the disclosure includes an optical sensing array, an analog front end circuit and an image processing circuit. The optical sensing array is configured for sequentially outputting a plurality of analog fingerprint images corresponding to a finger. The analog front end circuit is coupled to the optical sensing array. The analog front end circuit is configured for sequentially receiving and converting the plurality of analog fingerprint images into a plurality of first digital fingerprint images. The image processing circuit is coupled to the analog front end circuit. The image processing circuit is configured for sequentially superimposing the plurality of first digital fingerprint images to generate an enhanced fingerprint image.

According to another embodiment of the disclosure, a fingerprint sensing method provided by the disclosure includes the following: sequentially outputting a plurality of analog fingerprint images corresponding to a finger by an optical sensing array; sequentially receiving and converting the plurality of analog fingerprint images into a plurality of first digital fingerprint images by an analog front end circuit; and superimposing the plurality of first digital fingerprint images by an image processing circuit to generate an enhanced fingerprint image.

Based on the above, the fingerprint sensor and the fingerprint sensing method provided by the disclosure can acquire the enhanced fingerprint image with a high SNR by superimposing the plurality of first digital fingerprint images.

In order to make the aforementioned and other objectives and advantages of the disclosure comprehensible, embodiments accompanied with figures are described in detail below.

BRIEF DESCRIPTION OF THE DRAWINGS

For further understanding of the disclosure, the accompanying drawings, which are incorporated in and constitute a part of this specification, illustrate embodiments consistent with the present disclosure and, together with the description, serve to explain the principles of the present disclosure.

DESCRIPTION OF THE EMBODIMENTS

Figure 1:
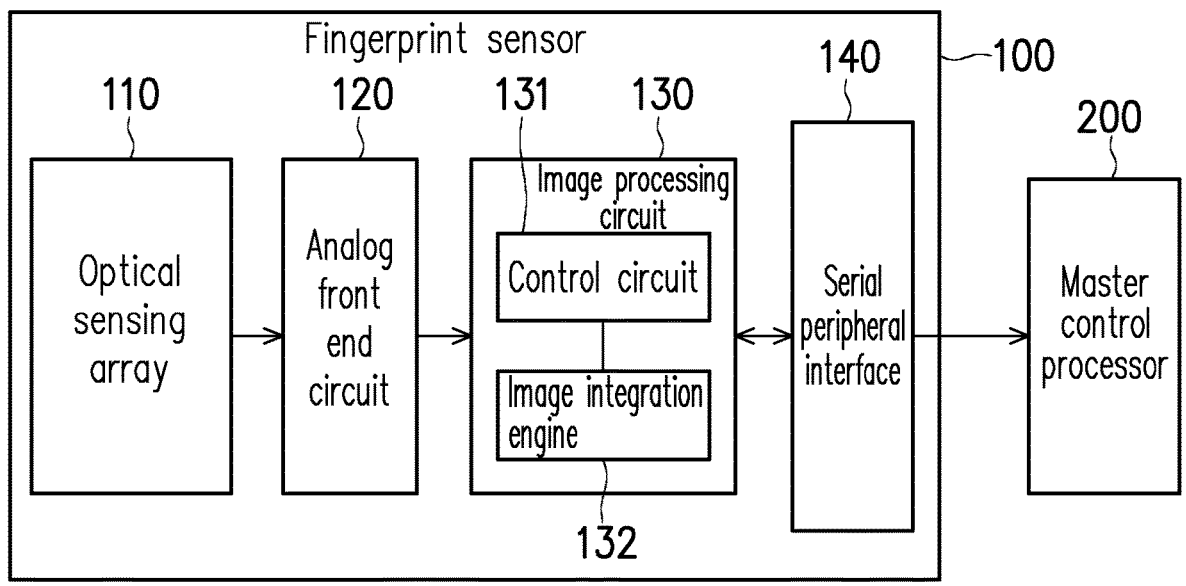
FIG. 1 is a schematic block diagram of a fingerprint sensor according to one embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of a fingerprint sensor according to one embodiment of the disclosure. Referring to FIG. 1, a fingerprint sensor 100 includes an optical sensing array 110, an analog front end (AFE) circuit 120 coupled to the optical sensing array 110, an image processing circuit 130 coupled to the AFE circuit 120 and a serial peripheral interface (SPI) 140 coupled to the image processing circuit 130. In the present embodiment, the fingerprint sensor 100 generates an enhanced fingerprint image through hardware computation. Therefore, the image processing circuit 130 may further include a control circuit 131 and an image integration engine 132. The control circuit 131 is configured for controlling the image integration engine 132 to generate the enhanced fingerprint image.

In the present embodiment, the fingerprint sensor 100 may also provide the enhanced fingerprint image to an external master control processor 200 through the SPI 140. In another embodiment, the fingerprint sensor 100 may be integrated into an electronic device including the master control processor 200 through modularization, but the disclosure is not limited thereto. The electronic device may be a personal computer (PC), an access control device, a tablet PC or a mobile phone, etc., or other electronic equipment adopting the optical fingerprint sensing technology.

Specifically, the optical sensing array 110 can continuously sense a finger while the fingerprint sensor 100 is sensing the fingerprint of the finger to sequentially output a plurality of analog fingerprint images corresponding to the finger to the AFE circuit 120. In the present embodiment, the AFE circuit 120 may include an analog-to-digital converter (ADC) sequentially receiving the analog fingerprint images and converting the analog fingerprint images into a plurality of digital fingerprint images. Next, the image integration engine 132 is configured for sequentially superimposing the plurality of digital fingerprint images and outputting an enhanced fingerprint image formed by superimposing the plurality of digital fingerprint images. Furthermore, each digital fingerprint image includes a fingerprint signal and random noise, and the intensity of the fingerprint signal is higher than that of the random noise in each digital fingerprint image. In other words, in the enhanced fingerprint image, as the number of superimposed images increases, the intensity of the fingerprint signal may gradually increase to significantly exceed the intensity of the random noise, and therefore, an enhanced fingerprint image with a high signal-to-noise ratio (SNR) can be generated in the present embodiment.

In the present embodiment, the control circuit 131 sequentially determines whether the SNR of the enhanced fingerprint image is higher than an SNR threshold or the data bit number thereof is higher than a bit number threshold to decide whether to stop the image integration engine 132 from superimposing the images. When the SNR threshold or the data bit number threshold is reached, the enhanced fingerprint image is output through the image integration engine 132, but the disclosure is not limited thereto. In another embodiment, the control circuit 131 may output the generated enhanced fingerprint image after controlling the image integration engine 132 to superimpose a defaulted number of digital fingerprint images.

Figure 2:
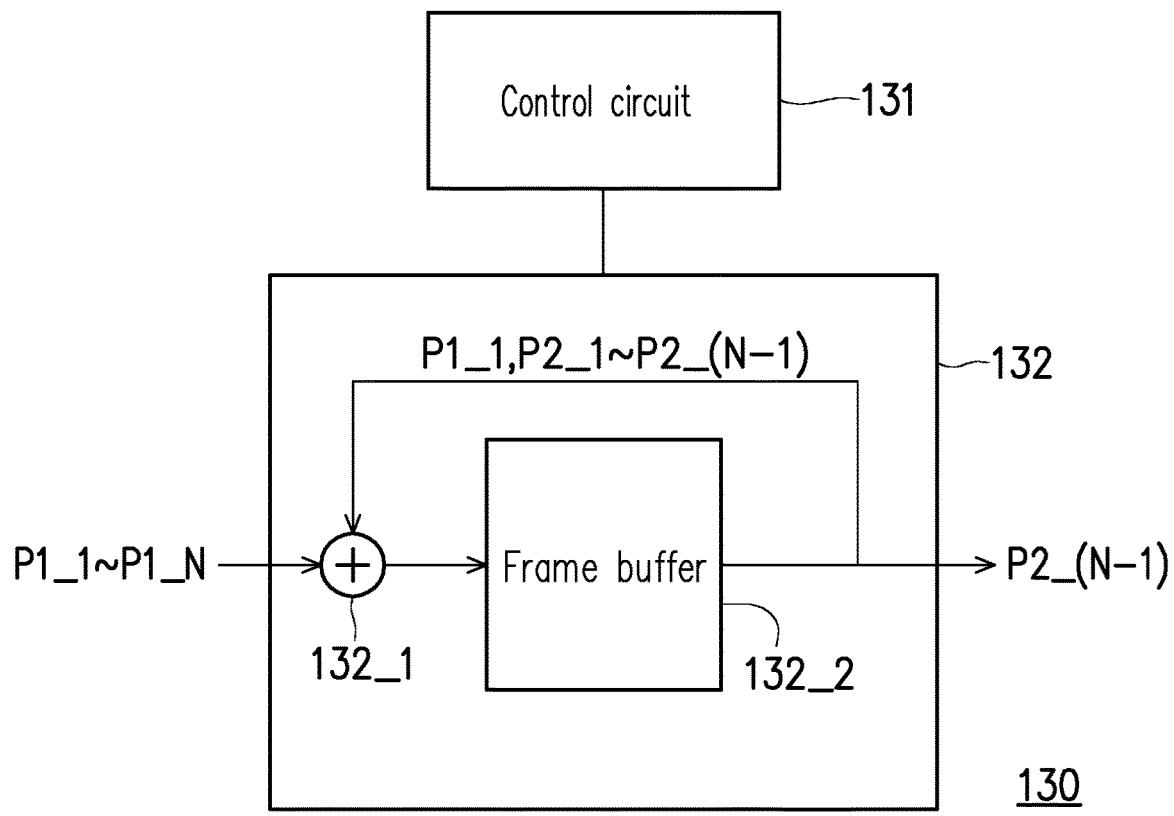
FIG. 2 is a schematic block diagram of an image processing circuit according to one embodiment of the disclosure.

FIG. 2 is a schematic block diagram of an image processing circuit according to one embodiment of the disclosure. Referring to FIG. 1 and FIG. 2 at the same time, the image integration engine 132 includes an adder 132_1 and a frame buffer 132_2. In the present embodiment, the adder 132_1 is coupled to the AFE circuit 120 and sequentially receives a plurality of digital fingerprint images P1_1 to P1_N provided by the AFE circuit 120, where N is a positive integer larger than 1. In the present embodiment, the frame buffer 132_2 is configured for temporarily storing a previous digital fingerprint image output by the adder 132_1 previously. The frame buffer 132_2 outputs the previous digital fingerprint image currently being temporarily stored to the adder 132_1 at the time when the adder 132_1 acquires a current digital fingerprint image, so that the adder 132_1 may superimpose the previous digital fingerprint image and the current digital fingerprint image and output the superimposed digital fingerprint image to the frame buffer 132_2 to update the frame buffer 132_2.

Figure 3:
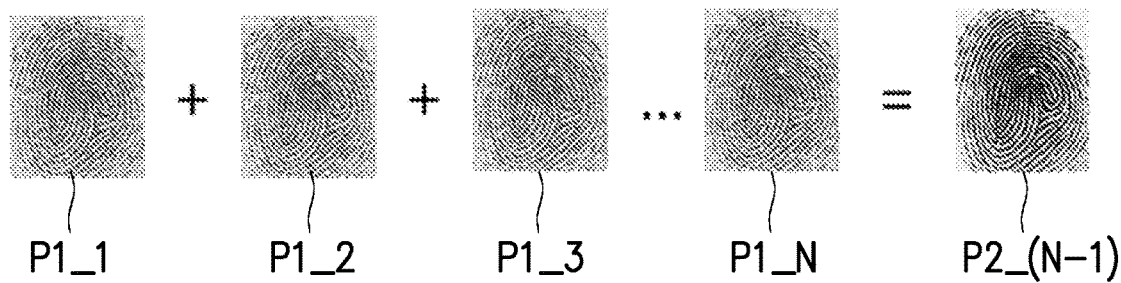
FIG. 3 is a schematic diagram of superimposing a plurality of digital fingerprint images according to one embodiment of the disclosure.

For example, referring to FIG. 3 which is a schematic diagram of superimposing a plurality of digital fingerprint images according to one embodiment of the disclosure. The frame buffer 132_2 has no digital fingerprint image currently being temporarily stored when the adder 132_1 acquires the digital fingerprint image P1_1, and therefore, the adder 132_1 directly outputs the digital fingerprint image P1_1 to the frame buffer 132_2 to temporarily store the digital fingerprint image P1_1. Next, the frame buffer 132_2 outputs the digital fingerprint image P1_1 currently being temporarily stored to the adder 132_1 at the time when the adder 132_1 acquires the digital fingerprint image P1_2, so that the adder 132_1 may superimpose the digital fingerprint image P1_1 and the digital fingerprint image P1_2 and output a superimposed digital fingerprint image P2_1 to the frame buffer 132_2 to temporarily store the superimposed digital fingerprint image P2_1. Then, the frame buffer 132_2 outputs the digital fingerprint image P2_1 (the digital fingerprint image formed by superimposing the digital fingerprint image P1_1 and the digital fingerprint image P1_2) currently being temporarily stored to the adder 132_1 at the time when the adder 132_1 acquires the digital fingerprint image P1_3, so that the adder 132_1 may superimpose the digital fingerprint image P1_3 and the digital fingerprint image P2_1 and outputs a superimposed digital fingerprint image P2_2 the frame buffer 132_2 to update the frame buffer 132_2.

Following this principle, at the time when the control circuit 131 determines that the SNR of the digital fingerprint image P2_(N−1) temporarily stored by the frame buffer 132_2 is higher than the SNR threshold or the data bit number is higher than the data bit number threshold, the control circuit 131 disables the image integration engine 132, and outputs the digital fingerprint image P2_(N−1) temporarily stored by the frame buffer 132_2 to the SPI 140. That is, when the control circuit 131 of the present embodiment determines that the SNR of the digital fingerprint image P2_(N−1) formed after the digital fingerprint images P1_1 to P1_N are sequentially superimposed reaches an expected SNR, the control circuit 131 stops the image integration engine 132 from further superimposing images. Alternatively, in another embodiment, the control circuit 131 may control the image integration engine 132 to stop superimposing images according to whether the data bit number of the digital fingerprint image P2_(N−1) in the frame buffer 132_2 is higher than the bit number threshold to prevent the data volume of the digital fingerprint image generated by further superimposing images by the adder 132_1 from exceeding the storage space of the frame buffer 132_2.

Figure 4:
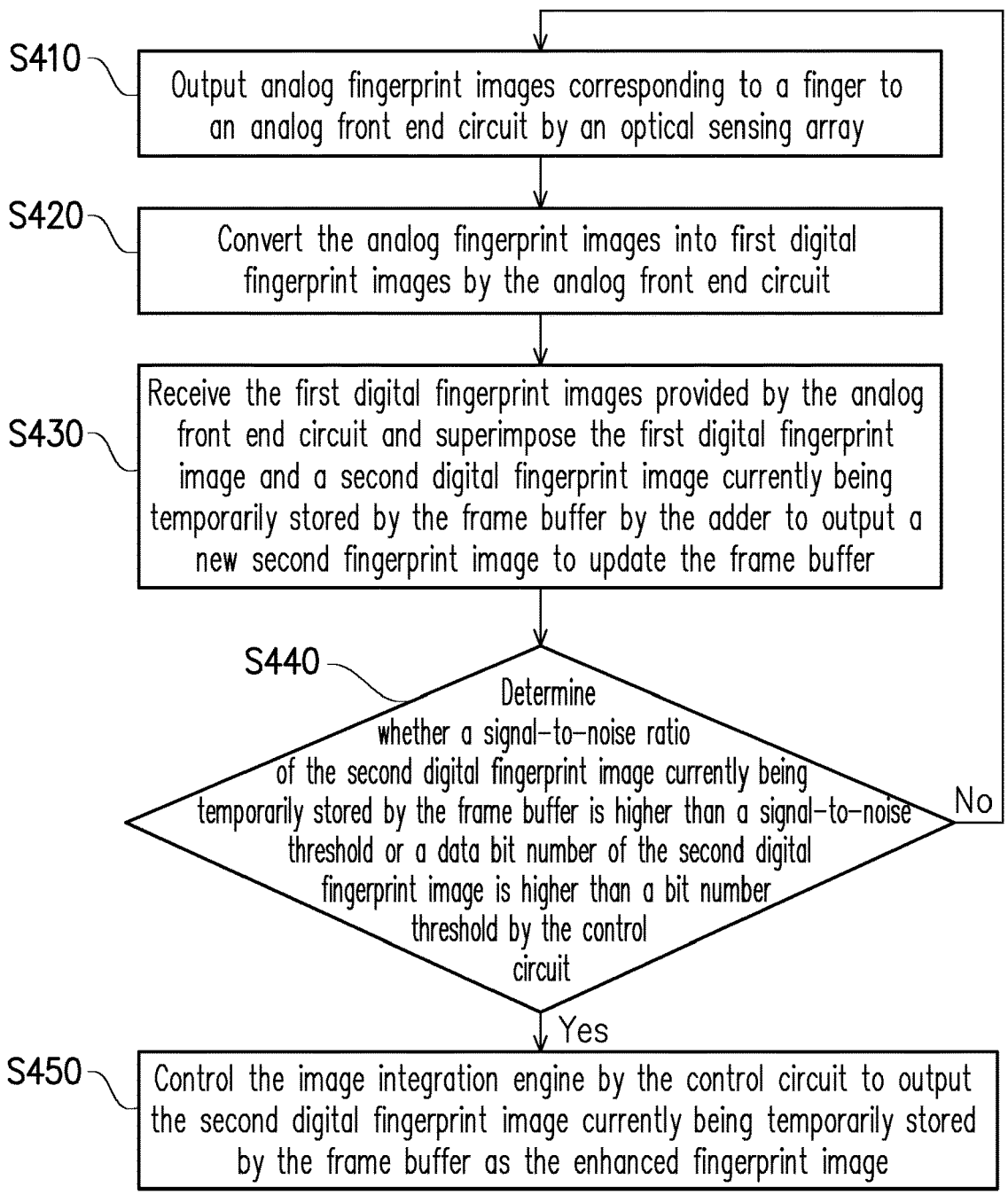
FIG. 4 is a flowchart of a fingerprint sensing method according to one embodiment of the disclosure.

FIG. 4 is a flowchart of a fingerprint sensing method according to one embodiment of the disclosure. Referring to FIG. 1, FIG. 2 and FIG. 4 at the same time, in step S410, the optical sensing array 110 of the fingerprint sensor 100 sequentially outputs the analog fingerprint images corresponding to the finger to the AFE circuit 120. In step S420, the AFE circuit 120 converts the analog fingerprint images into the first digital fingerprint images. In step S430, the adder 132_1 receives the first digital fingerprint images provided by the AFE circuit 120 and superimposes the first digital fingerprint images and the second digital fingerprint image currently being temporarily stored by the frame buffer 132_2 to output the new second fingerprint image and update the frame buffer 132_2. In the present embodiment, the second digital fingerprint image currently being temporarily stored by the frame buffer 132_2 is the digital fingerprint image output by the adder 132_1 in the previous image superimposing process. In step S440, the control circuit 131 determines whether the SNR of the second digital fingerprint image currently being temporarily stored by the frame buffer 132_2 is higher than the SNR threshold or the data bit number of the second digital fingerprint image is higher than the bit number threshold. If No, step S410 is performed again, and the optical sensing array 110 continues to output a next analog fingerprint image corresponding to the finger to the AFE circuit 120. If Yes, step S450 is performed. In step S450, the control circuit 131 controls the image integration engine 132 to output the second digital fingerprint image currently being temporarily stored by the frame buffer 132_2 as the enhanced fingerprint image. Therefore, with the fingerprint sensing embodiment according to the present embodiment, the fingerprint sensor 100 can generate the enhanced fingerprint image with a high SNR.

Based on the above, the fingerprint images can be superimposed through hardware computation according to the fingerprint sensor and the fingerprint sensing method provided by the disclosure, so as to generate the enhanced fingerprint image with a high SNR.

It will be apparent to those skilled in the art that various modifications and variations can be made to the structure of the disclosure without departing from the scope or spirit of the disclosure. In view of the foregoing, it is intended that the disclosure cover modifications and variations of this invention provided they fall within the scope of the following claims and their equivalents.

What is claimed is:

1. A fingerprint sensor, comprising:
    an optical sensing array, configured for sequentially outputting a plurality of analog fingerprint images corresponding to a finger;
    an analog front end circuit, coupled to the optical sensing array and configured for sequentially receiving and converting the plurality of analog fingerprint images into a plurality of first digital fingerprint images; and
    an image processing circuit, coupled to the analog front end circuit and configured for sequentially superimposing a plurality of full images of the plurality of first digital fingerprint images by directly adding a plurality of data bits of the plurality of first digital fingerprint images to generate an enhanced fingerprint image,
    wherein the image processing circuit comprises a control circuit, and the control circuit is configured for determining whether a signal-to-noise ratio of the enhanced fingerprint image is higher than a signal-to-noise ratio threshold or a data bit number of the enhanced fingerprint image is higher than a bit number threshold so as to output the enhanced fingerprint image.

2. The fingerprint sensor according to claim 1, wherein the image processing circuit comprises an image integration engine, and the image integration engine comprises:
    an adder, coupled to the analog front end circuit and configured for sequentially receiving the plurality of first digital fingerprint images provided by the analog front end circuit; and
    a frame buffer, coupled to the adder and configured for temporarily storing a second digital fingerprint image output by the adder,
    wherein the adder superimposes each of the plurality of first digital fingerprint images and the second digital fingerprint image currently being temporarily stored by the frame buffer to sequentially output a new second digital fingerprint image to update the frame buffer.

3. The fingerprint sensor according to claim 2, wherein the control circuit is coupled to the image integration engine,
    wherein the control circuit is configured for determining whether a signal-to-noise ratio of the second digital fingerprint image currently being temporarily stored by the frame buffer is higher than the signal-to-noise ratio threshold, or a data bit number of the second digital fingerprint image is higher than the bit number threshold so as to adopt the second digital fingerprint image as the enhanced fingerprint image and output the enhanced fingerprint image.

4. The fingerprint sensor according to claim 2, wherein the adder superimposes a first gray value of each pixel of each of the plurality of first digital fingerprint images and a second gray value of each pixel of the second digital fingerprint image currently being temporarily stored by the frame buffer to sequentially output the new second fingerprint image.

5. The fingerprint sensor according to claim 2, further comprising:
    a serial peripheral interface, coupled to the image processing circuit and a master control processor outside the fingerprint sensor,
    wherein after the adder completes superimposing the plurality of first digital fingerprint images, the image processing circuit adopts the second digital fingerprint image temporarily stored by the frame buffer as the enhanced fingerprint image and outputs the enhanced fingerprint image to an external master control processor through the serial peripheral interface.

6. The fingerprint sensor according to claim 1, wherein each of the plurality of first digital fingerprint images comprises a fingerprint signal and random noise, and the signal-to-noise ratio of the enhanced fingerprint image is higher than a signal-to-noise ratio of each of the plurality of first digital fingerprint images.

7. A fingerprint sensing method, comprising:
    sequentially outputting a plurality of analog fingerprint images corresponding to a finger by an optical sensing array;
    sequentially receiving and converting the plurality of analog fingerprint images into a plurality of first digital fingerprint images by an analog front end circuit; and
    superimposing a plurality of full images of the plurality of first digital fingerprint images by directly adding a plurality of data bits of the plurality of first digital fingerprint images by an image processing circuit to generate an enhanced fingerprint image,
    wherein the step of superimposing the plurality of first digital fingerprint images by directly adding the plurality of data bits of the plurality of first digital fingerprint images by the image processing circuit to generate the enhanced fingerprint image comprises:
    determining whether a signal-to-noise ratio of the enhanced fingerprint image is higher than a signal-to-noise ratio threshold or a data bit number of the enhanced fingerprint image is higher than a bit number threshold so as to output the enhanced fingerprint image.

8. The fingerprint sensing method according to claim 7, wherein the step of superimposing the plurality of first digital fingerprint images by the image processing circuit to generate the enhanced fingerprint image comprises:
    sequentially receiving the plurality of first digital fingerprint images provided by the analog front end circuit and superimposing each of the plurality of first digital fingerprint images and a second digital fingerprint image currently being temporarily stored by the frame buffer by the adder to sequentially output a new second fingerprint image to update the frame buffer.

9. The fingerprint sensing method according to claim 8, wherein the step of superimposing the plurality of first digital fingerprint images by directly adding the plurality of data bits of the plurality of first digital fingerprint images by the image processing circuit to generate the enhanced fingerprint image further comprises:
    determining whether a signal-to-noise ratio of the second digital fingerprint image is higher than the signal-to-noise ratio threshold, or a data bit number of the second digital fingerprint image is higher than the bit number threshold, so as to adopt the second digital fingerprint image currently as the enhanced fingerprint image and output the enhanced fingerprint image.

10. The fingerprint sensing method according to claim 8, wherein the step of superimposing each of the plurality of first digital fingerprint images and the second digital fingerprint image currently being temporarily stored by the frame buffer comprises:

superimposing a first gray value of each pixel of each of the plurality of first digital fingerprint images and a second gray value of each pixel of the second digital fingerprint image currently being temporarily stored by the frame buffer by the adder to sequentially output the new second fingerprint image.

11. The fingerprint sensing method according to claim 8, further comprising:

adopting the second digital fingerprint image temporarily stored by the frame buffer as the enhanced fingerprint image by the image processing circuit and outputting the enhanced fingerprint image to an external master control processor through a serial peripheral interface after the adder completes superimposing the plurality of first digital fingerprint images.

12. The fingerprint sensing method according to claim 7, wherein each of the plurality of first digital fingerprint images comprises a fingerprint signal and random noise, and the signal-to-noise ratio of the enhanced fingerprint image is higher than a signal-to-noise ratio of each of the plurality of first digital fingerprint images.

\* \* \* \* \*